US010596997B1

(12) United States Patent
Salter et al.

(10) Patent No.: US 10,596,997 B1
(45) Date of Patent: Mar. 24, 2020

(54) USER INTERFACE OF AUTONOMOUS DELIVERY VEHICLE

(71) Applicant: Ford Global Technologies, LLC, Dearborn, MI (US)

(72) Inventors: Stuart C. Salter, White Lake, MI (US); Paul Kenneth Dellock, Northville, MI (US); David Brian Glickman, Southfield, MI (US); Cornel Lewis Gardner, Romulus, MI (US); Kosta Papanikolaou, Huntington Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/149,834

(22) Filed: Oct. 2, 2018

(51) Int. Cl.
*B60R 25/23* (2013.01)
*B60R 25/30* (2013.01)
*G06Q 10/08* (2012.01)
*G07C 9/00* (2020.01)

(52) U.S. Cl.
CPC ............ *B60R 25/23* (2013.01); *B60R 25/305* (2013.01); *G06Q 10/083* (2013.01); *G07C 9/00309* (2013.01); *G07C 2009/0042* (2013.01)

(58) Field of Classification Search
None
See application file for complete search history.

(56) References Cited

U.S. PATENT DOCUMENTS

| | | |
|---|---|---|
| 7,398,865 B2 | 7/2008 | Felder et al. |
| 9,441,403 B2 | 9/2016 | Kraus et al. |
| 9,922,472 B2 | 3/2018 | Jergess et al. |
| 2005/0078090 A1 | 4/2005 | Glatzer et al. |
| 2005/0110763 A1 | 5/2005 | Chemla |
| 2016/0342943 A1* | 11/2016 | Wiechers ........... G06Q 10/0833 |
| 2017/0018129 A1 | 1/2017 | Huebner |
| 2017/0072908 A1 | 3/2017 | Liubakka et al. |

* cited by examiner

*Primary Examiner* — Daniell L Negron
(74) *Attorney, Agent, or Firm* — Frank Lollo; Eversheds Sutherland (US) LLP

(57) ABSTRACT

An automated delivery vehicle includes a user interface for controlling access to a designated cargo within the vehicle. The user interface provides access to the cargo for a first period and activates second keys in response to receiving an access code via first keys while the vehicle is parked. The user interface provides, for a second period, access to the cargo and prevents the vehicle from moving in response to one of the activated second keys being actuated.

20 Claims, 8 Drawing Sheets

USER INTERFACE OF AUTONOMOUS DELIVERY VEHICLE

TECHNICAL FIELD

The present disclosure generally relates to a user interface of an autonomous delivery vehicle and, more specifically, systems and methods for controlling the user interface of the autonomous delivery vehicle.

BACKGROUND

Certain known autonomous vehicles automatically deliver packages. For example, one known autonomous delivery vehicle include a cargo for storing packages and an interface for granting access to the cargo. To access the cargo, a user provides an access code to the interface, and in response, the interface unlocks a door to the cargo.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Apparatus and methods for controlling an autonomous delivery vehicle are disclosed. An example vehicle includes a cargo and a user interface. The user interface includes first keys, second keys, and a processor. While the vehicle is parked, the processor, in response to receiving an access code via the first keys, provides access to the cargo for a first period and activates second keys. The processor, in response to one of the activated second keys being actuated, continues to provide access to the cargo and prevents the vehicle from moving for a second period.

An example method of controlling a vehicle includes, responsive to receiving an access code via first keys of a user interface while the vehicle is parked, providing access to a cargo of the vehicle for a first period and activating second keys of the user interface. The method further includes, responsive to one of the activated second keys being actuated, for a second period, providing an access to the cargo and preventing the vehicle from moving.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
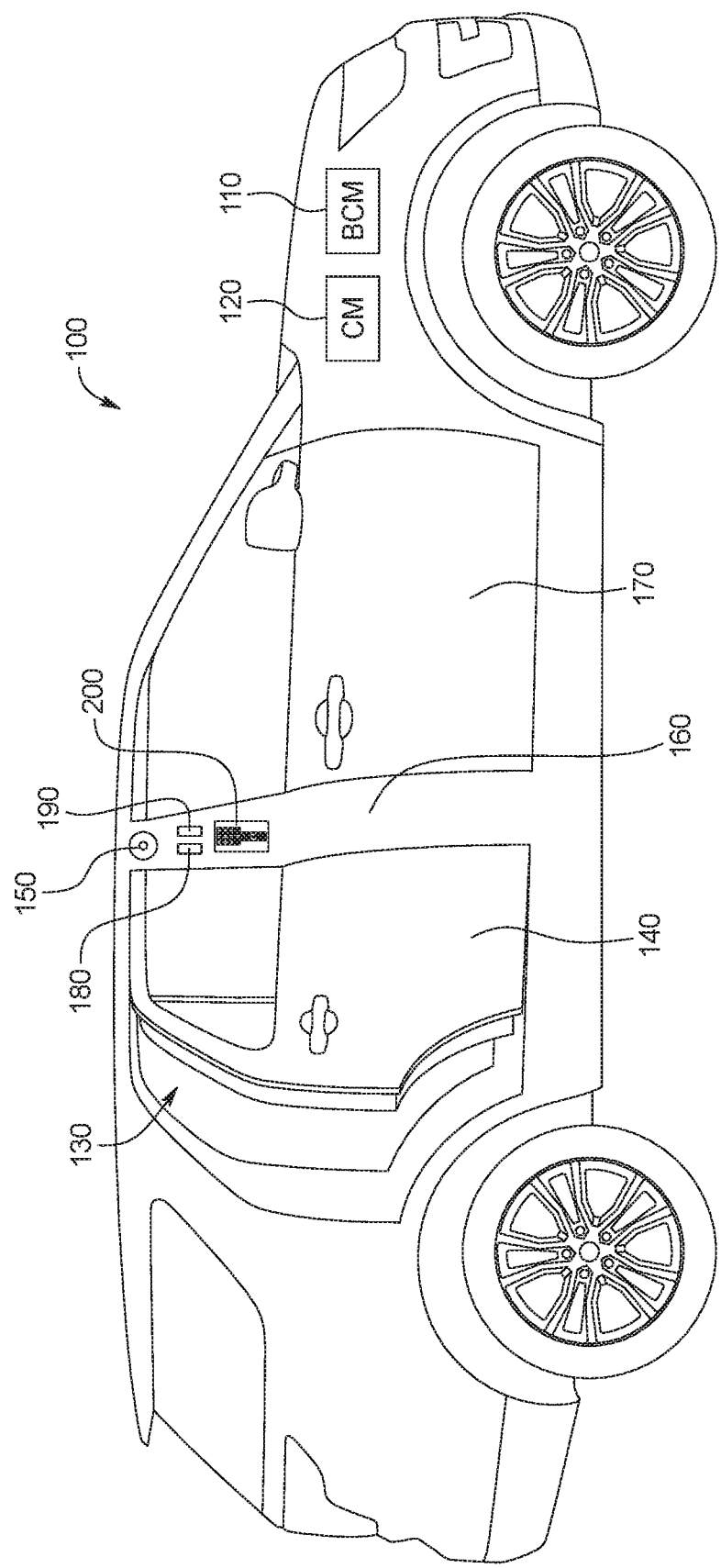
FIG. 1. illustrates a vehicle operating in accordance with this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Autonomous delivery vehicles automatically deliver packages. Generally, a user orders an autonomous delivery vehicle from a depot, and receives, from the depot, an access code for accessing a designated cargo of the autonomous delivery vehicle. When the autonomous vehicle arrives at the location of the user, the user provides the access code to an interface provided on the exterior of the autonomous vehicle. While the interface provides features for verifying the user and granting access to the designated cargo, the interface typically lacks options for the user to further interact with the autonomous delivery vehicle. Further, addition of such features increases manufacturing costs and complexity for first time users of the interface.

Example methods and apparatus disclosed herein describes a delivery interface. The delivery interface includes a keypad and lighting devices. The key pad includes a first plurality of keys and a second plurality of keys. The first plurality of keys serve as an interface for receiving the access code for accessing the designated cargo of the autonomous vehicle. The second plurality of keys serve as an interface for controlling the autonomous vehicle. The lighting devices are responsive to actuations of the first plurality of keys and the second plurality of keys. The lighting devices indicate the status of the autonomous package delivery. The delivery interface allows a user to: (1) extend a duration for accessing the designated cargo, (2) temporarily lock the access to the designated cargo, and (3) temporarily hold the autonomous delivery vehicle from departing.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be semi-autonomous (e.g., some routine motive functions controlled by the vehicle) or autonomous (e.g., motive functions are controlled by the vehicle without direct driver input). In the illustrated example, the vehicle 100 includes a body control module 110 (also referred to as a BCM), a communication module 120, a designated cargo 130, a designated door 140, a camera 150, a speaker 180, a microphone 190, and an delivery interface 200. The BCM 110, the communication module 120, the camera 150, the speaker 180, the microphone 190, the delivery interface 200, and other electronic device (e.g., door motor) are electrically coupled to each other via one or more vehicle data/power bus (not illustrated).

The BCM 110 of the illustrated example is an electronic control unit (ECU) of the vehicle 100. ECUs monitor and control the subsystems of the vehicle 100. For example, the ECUs are discrete sets of electronics that include their own circuit(s) (e.g., integrated circuits, microprocessors, memory, storage, etc.) and firmware, sensors, actuators, and/or mounting hardware. The ECUs communicate and exchange information (e.g., via a vehicle data bus). Additionally, the ECUs may communicate properties (e.g., status of the ECUs, sensor readings, control state, error and diagnostic codes, etc.) to and/or receive requests from each other. For example, the vehicle 100 may include dozens of ECUs that are positioned in various locations around the vehicle 100. The BCM 110 controls one or more subsystems throughout the vehicle 100, such as electronic door latches (e-latches), vehicle door motors, power windows, an immobilizer system, power mirrors, etc. For example, the BCM 110 includes circuits that drive one or more of relays (e.g., to control wiper fluid, etc.), brushed direct current (DC) motors (e.g., to control power seats, power windows, wipers, etc.), stepper motors, LEDs, etc.

The communication module 120 of the illustrated example includes wired or wireless network interface(s) that enable communication with remote devices, an external server, other vehicles, etc. The communication module 120 includes hardware (e.g., processors, memory, storage, antenna, etc.) and software to control the wired or wireless network interface(s). In some examples, the communication module 120 includes a wireless personal area network (WPAN) module that is configured to wirelessly communicate with nearby device(s) via short-range wireless communication protocol(s). For example, the communication module 120 includes antenna(s) to wirelessly communicate via the Bluetooth® and/or Bluetooth® Low Energy (BLE) protocols. Additionally or alternatively, the communication module 120 includes antenna(s) to wirelessly communicate via Wi-Fi®, low frequency (LF) communication, Near Field Communication (NFC), Radio-Frequency Identification (RFID), ultra-wide band (UWB) communication, ultra-high frequency (UHF) communication, and/or any other wireless communication protocol. Additionally or alternatively, the communication module 120 includes wired or wireless network interface(s) that enable communication with external networks. For example, the communication module 120 is configured to wirelessly communicate with a nearby device via an external network. The external network(s) may be a public network, such as the Internet; a private network, such as an intranet; or combinations thereof, and may utilize a variety of networking protocols now available or later developed including, but not limited to, TCP/IP-based networking protocols. For example, the communication module 120 includes one or more communication controllers for cellular networks, such as Global System for Mobile Communications (GSM), Universal Mobile Telecommunications System (UMTS), Long Term Evolution (LTE), Code Division Multiple Access (CDMA).

The designated cargo 130 is a storage space within the vehicle 100 for storing packages of the user. In some examples, the designated cargo 130 may be defined by an existing interior space within the vehicle 100. In some examples, the designated cargo 130 may be separate and independent from the existing interior space. In the illustrated example, the designated cargo 130 is a passenger side vehicle cabin.

The designated door 140 is a gateway to the designated cargo 130. The designated door 140 may be higedly connected to the vehicle 100 or slidably connected to the vehicle 100. In this illustrate example, movements of the designated door 140 are fully automated. For example, movements of designated door may be powered by a vehicle door motor (not illustrated).

The camera 150 monitors an area surrounding the delivery interface 200. In the illustrated example, the camera 150 is mounted on a pillar 160 positioned between a front door 170 and the designated door 140. In some examples, the vehicle 100 may include additional cameras (not illustrated) for monitoring the area (e.g., cameras mounted on side view mirrors).

The microphone 190 and the speaker 180 enable a user to establish communication with a depot. In some examples, the speaker 180 further provides an audible warning. In this illustrate example, the microphone 190 and the speaker 180 are mounted on the pillar 160.

The delivery interface 200 serves as an interface for the user to control the vehicle 100 and accesses to the designated cargo 130. In the illustrated example, the delivery interface 200 is mounted on the pillar 160.

Figure 2A:
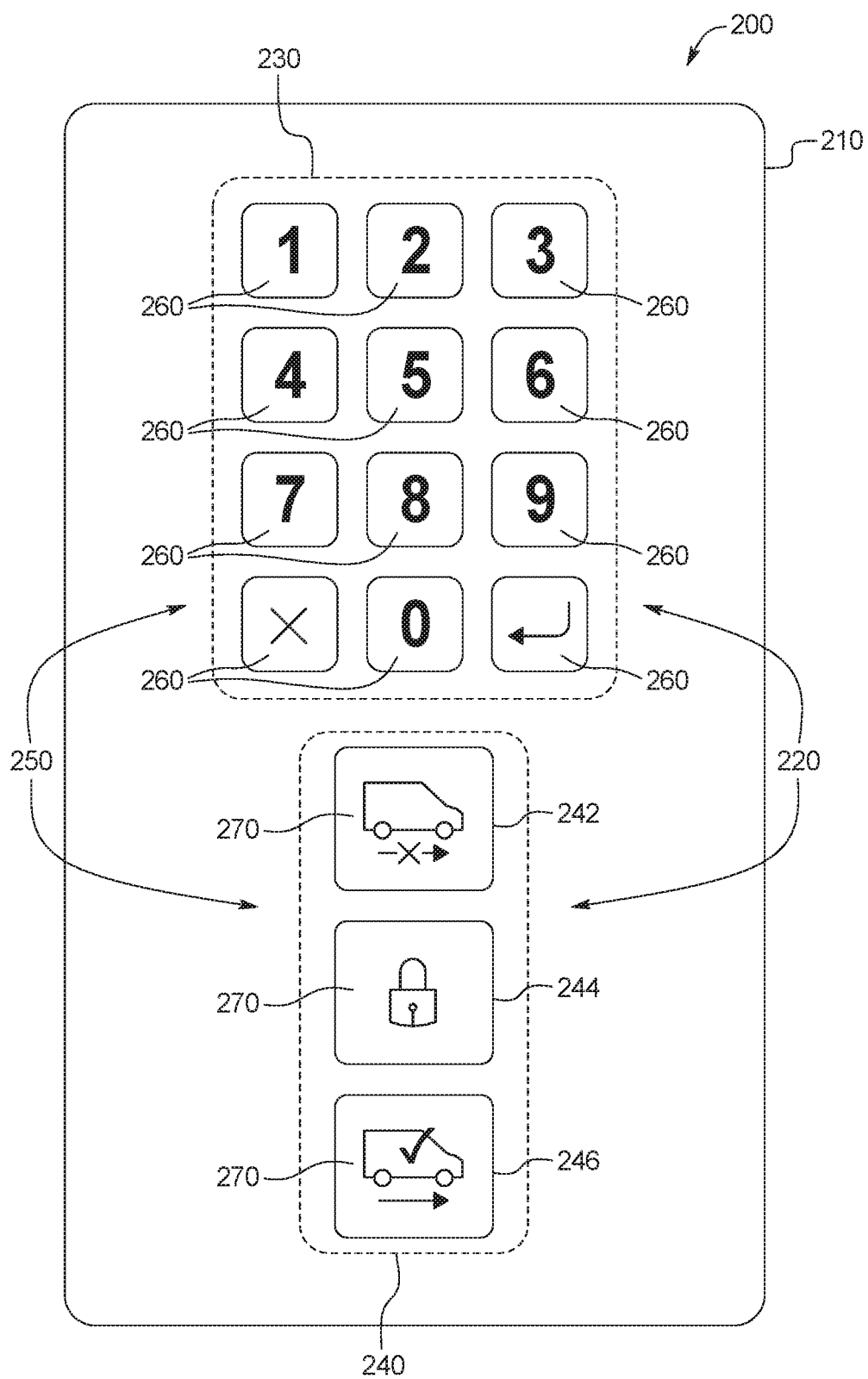
FIG. 2A illustrates a delivery interface of FIG. 1.

FIG. 2A illustrates the delivery interface 200 of FIG. 1. The delivery interface 200 includes a housing 210, a keypad 220, lighting devices 250, and a printed circuit board 280 (PCB) (see FIG. 2B).

In the illustrated example, the keypad 220 and the lighting devices 250 are disposed along an external surface of the housing 210. The housing 210 stores the PCB 280 and other electronic components (not illustrated).

The key pad includes mechanical switches defining a first plurality of keys 230 and a second plurality of keys 240. Each of the mechanical switches include an indicia indicative of a function associated with the corresponding mechanical switch.

The first plurality of keys 230 include alphanumeric keys, an enter key and a cancel key. The first plurality of keys 230 serve as an interface for entering the access code for accessing the designated cargo 130.

The second plurality of keys 240 include a hold-to-load key 242, a hold-and-lock key 244, and a loading-complete key. The second plurality of keys 240 serve as an interface for controlling the vehicle 100.

The lighting devices 250 serve as backlighting of the keypad 220. In the illustrated example, the lighting devices 250 include a first plurality of lighting devices 260 and a second plurality of lighting devices 270. Each of the first plurality of lighting devices 260 is integrated with each of the first plurality of keys 230, and each of the second plurality of lighting devices 270 is integrated with each of the second plurality of keys 240. The lighting devices 250 are capable of emitting light from a range colors. For example, the light devices may be multi-color light emitting diodes (LED). The lighting device may display a first illumination, a second illumination, a third illumination, or a fourth illumination. For example, the first illumination may be green, the second illumination may be blue or while, the third illumination may be red, and the fourth illumination may be amber. The lighting devices 250 are responsive to actuations of the first plurality of keys 230 and the second plurality of keys 240. The lighting devices 250 indicate the status of operations related to autonomous package delivery.

Figure 2B:
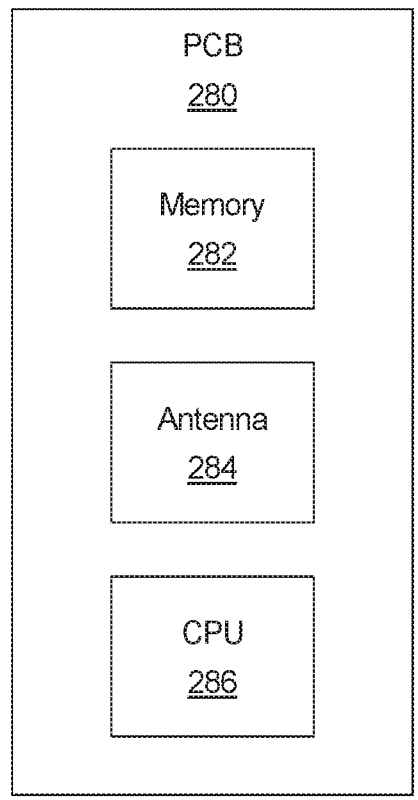
FIG. 2B illustrates a printed circuit board (PCB) included in the delivery interface of FIG. 1.

FIG. 2B illustrates the PCB 280 included in the delivery interface 200 of FIG. 1. The delivery interface 200 includes memory 282, an antenna 284, and a processor 286.

The memory 282 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 282 includes multiple kinds of memory, particularly volatile memory and non-volatile memory. The memory 282 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory, the computer readable medium, and/or within the processor 286 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The antenna 284 is a directional antenna. The antenna 284 transmits and/or receives signals at greater magnitude in certain directions. For example, the antenna 284 may only wirelessly couple with a mobile device that are directly in front the delivery interface 200 (e.g., within 5 feet of the antenna 284). The antenna 284 support Bluetooth® and/or Bluetooth® Low Energy (BLE) protocols The processor 286 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The processor 286 transmits/receives commands to/from the lighting device, the antenna 284, the memory, one or more ECUs, and/or other electronic devices included in the vehicle 100.

Example operations of the delivery interface 200 will be describe in detail below.

At the outset, the vehicle 100 may be instructed to autonomously travel to a designated location for meeting a user. While the vehicle 100 is in motion, functions of the delivery interface 200 are partially or fully disabled. For example, the lighting devices 250 and the keypad 220 may be operational only when the vehicle 100 is parked and/or the vehicle 100 arrives at the designated location.

Once the vehicle 100 arrives at the designated location and/or the vehicle 100 is parked, the delivery interface 200 initiates an access operation. During the access operation, the package delivery interface 200 activates only the first plurality of the lighting devices 250 in order to indicate to the user that the delivery interface 200 is ready to accept the access code. At this time, the first plurality of lighting devices 260 display the first illumination. Preferably, the first illumination is displayed, since the green light from the visible spectrum is most sensitive to a human eye. Therefore, to account for environmental lighting (e.g., daylight), it may be preferable to display an illumination that is most recognizable to a user.

While the first plurality of keys 230 display the first illumination, and one or more of the first plurality of keys 230 are actuated by the user, one or more lighting devices corresponding to the one or more of the first plurality of keys 230 temporally displays the second illumination to indicate to a user that the delivery interface 200 has received the user input. In such examples, the duration at which each of the one or more lighting devices displays the second illumination is the same or substantially the same as a duration at which each of the one or more of the first plurality of keys 230 is actuated by the user.

While the first plurality of keys 230 display the first illumination, and any key of the first plurality of keys 230 is actuated for the first instance, the delivery interface 200 causes the camera 150 to capture one or more images of the user and/or an area surrounding the delivery interface 200 for security.

While the first plurality of keys 230 display the first illumination, and no user input is received by the first plurality of keys 230, the first plurality of lighting devices 260 pulses the light intensity of the first illumination within a predetermined range (e.g., 50%-100%) to indicate that the delivery interface 200 is idling and waiting for a user input.

When an incorrect code is provided by the user, the first plurality of lighting devices 260 display the third illumination for a predetermined period (e.g., 5 seconds) and return to the first illumination. In some examples, when an incorrect code is entered a threshold amount (e.g., 5 times), the delivery interface 200 establishes a direct communication between the depot and the user. For example, the delivery interface 200 may cause the communication module 120 to establish direct communication with the depot and the user's mobile device. In some examples, the delivery interface 200 may cause the speaker 180 and the microphone 190 may establish direct communication between the depot and the user.

When the delivery interface 200 receives the correct access code, the delivery interface 200: (1) deactivates the first plurality of keys 230 and the first plurality of lighting devices 260; (2) activates the second plurality of keys 240 to display the first illumination; and (3) automatically unlock and open the designated door 140. At this time, the delivery interface 200 grants the user a designated period (e.g., 15 seconds). When the designated period elapses, the delivery interface 200 initiates a loading complete operation.

When the hold-to-load key 242 is actuated, the delivery interface 200 performs a hold-to-load operation. During the hold-to-load operation, the delivery interface 200: (1) causes the lighting device corresponding to the hold-to-load key 242 to display the fourth illumination; (2) pulses the fourth illumination; (3) deactivates the second plurality of keys 240; (4) deactivates the remaining second plurality of lighting devices 270; (5) notifies the depot an occurrence of the hold-to-load operation. In some examples, during the hold-to-load operation, the delivery interface 200 may provide an option for the user to opt out of the hold-to-load operation. In such examples, the delivery interface 200: (1) reactivates the first plurality of keys 230; (2) cause the first plurality of lighting devices 260 to display the first illumination; and (3) opts out of the hold-to-load operation in response to receiving the access code. After a predetermined period (e.g., 5 minutes), the delivery interface 200 issues an alarm to the user via the user's mobile device and/or the speaker 180.

Subsequently, the delivery interface 200 waits for an additional period (e.g., 1 minute) prior to terminating the hold-to-load operation.

When the hold-and-lock key 244 is actuated, the delivery interface 200 performs a hold-and-lock operation. During the hold-and-lock operation, the delivery interface 200: (1) automatically closes and locks the designated door 140; (2) causes the lighting device corresponding to the hold-and-lock key 244 to display the fourth illumination; (3) pulses the fourth illumination; (4) deactivates the remaining second plurality of lighting devices 270; (5) deactivates the second plurality of lighting devices 270; (6) notifies the depot an occurrence of the hold-and-lock operation; (7) reactivates the first plurality of keys 230; (8) causes the first plurality of lightings to display the first illumination; and (9) automatically open and unlock the designated door 140 in response to receiving the access code via the first plurality of keys 230. After a predetermined period (e.g., 5 minutes) the delivery interface 200 issues an alarm to the user via the user's mobile device and/or the speaker 180. Subsequently, the delivery interface 200 waits for an additional period (e.g., 1 minute) prior to terminating the hold-and-lock operation. In some examples, the delivery interface 200 initiates the hold-and-lock operation when the hold-and-lock key 244 is sequentially actuated twice. In some examples, the delivery interface 200 initiates the hold-and-lock operation after a short delay (e.g., 3 seconds) subsequent to the actuation of the hold-and-lock key 244. In such examples, the short delay ensures a small window of time for the user to select a different key among the second plurality of keys 240.

In some examples, subsequent to the termination of the hold-to-load operation or the hold-and-lock operation, the delivery interface 200 may reset the designated period and cause the second plurality of keys 240 to be available to the user. In alternative examples, the delivery interface 200 may initiate a loading complete operation at the termination of the hold-to-load operation or the hold-and-lock operation.

When the loading complete key 246 is actuated or the designated period has elapsed, the delivery interface 200 initiates the loading complete operation For example, during the loading complete operation, the delivery interface 200: (1) checks for any passengers within the designated cargo 130 via one or more sensors within the vehicle 100 (not illustrated); (2) automatically closes and locks the designated door 140; and (3) deactivate the keypad 220 and the lighting devices 250. In some examples, the delivery interface 200 may grant a grace period (e.g., 5 seconds) after the actuation of the loading complete key 246 and prior to the deactivation of the keypad 220 and the lighting devices 250. During the grace period, the delivery interface 200: (1) causes the lighting device corresponding to the loading complete key 246 to display and pulse the first illumination; and (2) causes the lighting devices 250 of the hold-to-load key 242 and the hold-and-lock key 244 to display the fourth illumination. The grace period ensures a small window of time for the user to select the hold-to-load key 242 or the hold-and-lock key 244.

In some examples, the delivery interface 200 establishes communication with the user's mobile device to facilitate the interaction between the delivery interface 200 and the user. For example, the delivery interface 200 may transmit, to the mobile device, information regarding current operations of the delivery interface 200. For example, the information may include instructions/tutorials for using the delivery interface 200, an amount of time remaining and/or elapsed for the current operation, the current status of the designated door 140, etc.

In some examples, the delivery interface 200 transmits, to the depot, information regarding user interaction with the delivery interface 200. For example, the information include may include a total amount of time elapsed from the arrival of the vehicle 100 to the departure of the vehicle 100.

Figure 3:
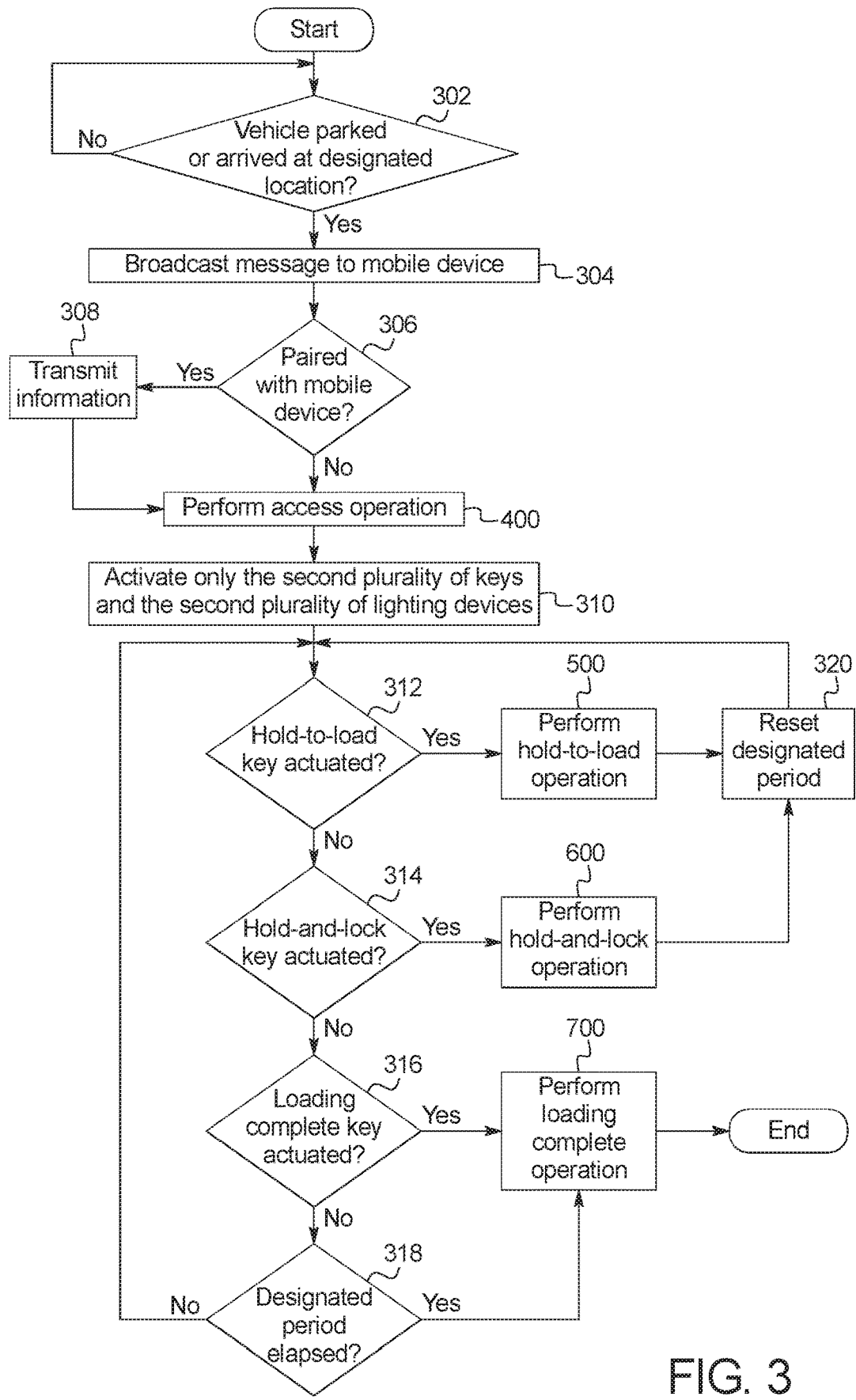
FIG. 3 illustrates is a flowchart of a method 300 for operating the delivery interface of FIG. 1.

FIG. 3 illustrates is a flowchart of a method 300 for operating the delivery interface 200 of FIG. 1.

At block 302, the delivery interface 200 determines if the vehicle 100 has arrived at a designated location for meeting a user. If so, the method 300 continues to block 304. Otherwise, the method 300 returns to block 302.

At block 304, the delivery interface 200 broadcasts a message to a mobile device.

At block 306, the delivery interface 200 determines if the delivery interface 200 has wirelessly paired with a mobile device. If so, the method 300 continues to step 308. Otherwise, the method 300 continues to step 400.

At block 308, the delivery interface 200 transmits information to the mobile device. For example, the information may include instructions/tutorials for using the delivery interface 200, an amount of time remaining and/or elapsed for the current operation, the current status of the designated door 140, etc.

At block 400, the delivery interface 200 performs the access operation. A method 300 for performing the access operation will be describe in detail with reference to FIG. 4.

At block 310, the delivery interface 200 activates only the second plurality of keys 240 and the second plurality of lighting devices 270.

At block 312, the delivery interface 200 determines if the hold-to-load key 242 has been actuated. If so, the method 300 continues to block 500. Otherwise, the method 300 continues to block 314.

At block 500, the delivery interface 200 performs the hold-to-load operation. A method 300 for performing the hold-to-load operation will be describe in detail with reference to FIG. 5.

At block 314, the delivery interface 200 determines if the hold-and-load key has been actuated. If so, the method 300 continues to block 600. Otherwise, the method 300 continues to block 316.

At block 600, the delivery interface 200 performs the hold-and-lock operation. A method 300 for performing the hold-and-lock operation will be described in detail with reference to FIG. 6.

At block 316, the delivery interface 200 determines if the loading complete key 246 has been actuated. If so, the method 300 continues to block 700. Otherwise, the method 300 continues to block 318.

At block 700, the delivery interface 200 initiates the loading complete operation. A method 300 for performing the loading complete operation will be described in detail with reference to FIG. 7. Subsequently, the method 300 terminates.

At block 318, the delivery interface 200 determines if the designated period has elapsed. If so, the method 300 returns to block 700.

At block 320, the delivery interface 200 resets the designated period.

Figure 4:
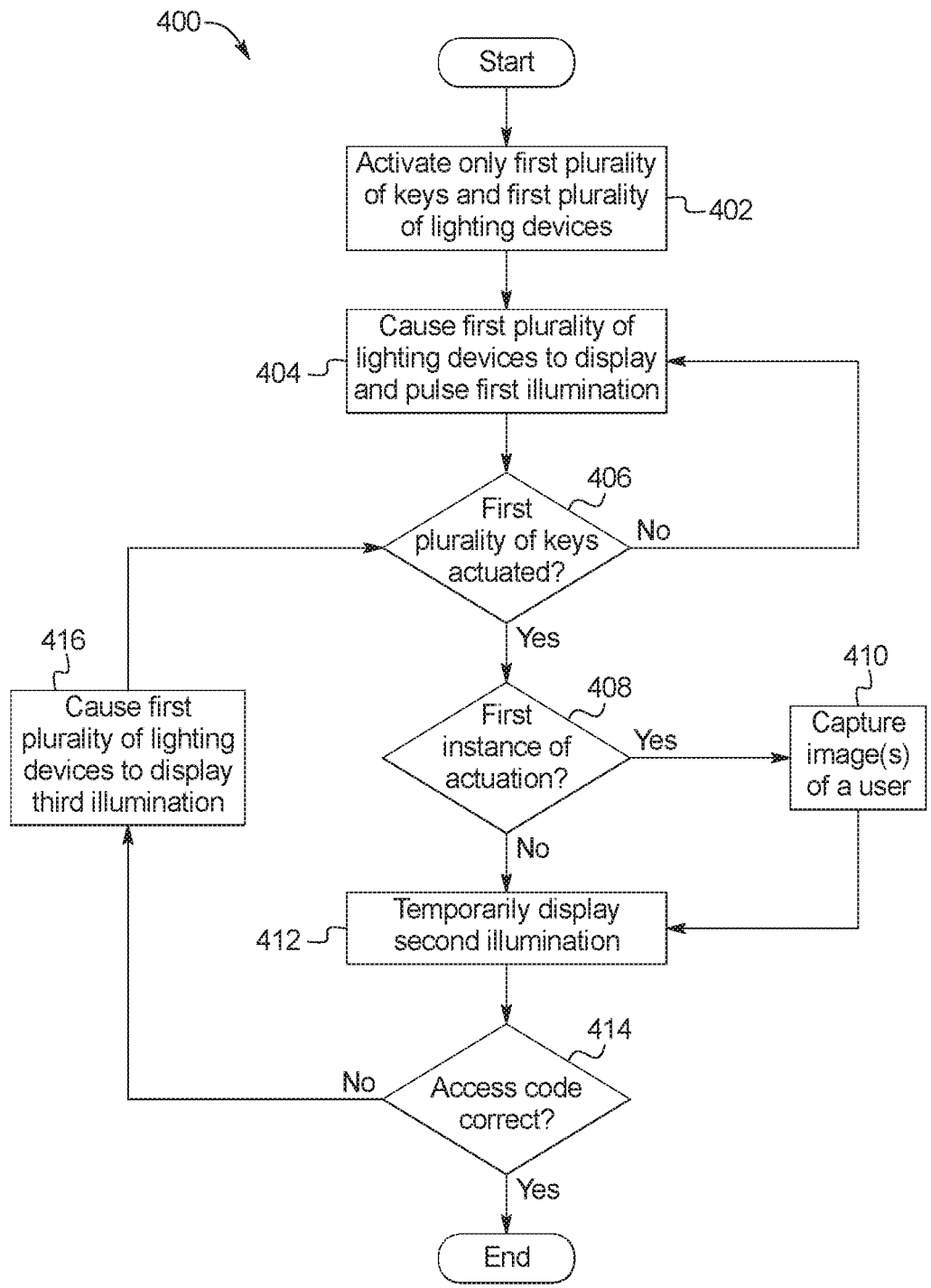
FIG. 4 illustrates a flowchart of a method for performing the access operation of FIG. 3.

FIG. 4 illustrates a flowchart of a method for performing the access operation of FIG. 3.

At block 402, the delivery interface 200 activates only the first plurality of keys 230 and the first plurality of lighting devices 260.

At block 404, the delivery interface 200 causes the first plurality of lighting devices 260 to display and pulse the first illumination.

At block 406, the delivery interface 200 determines if any key among the first plurality of key has been actuated. If so, the method continues to block 408. Otherwise, the method returns to block 404.

At block 408, the delivery interface 200 determines if any key among the first plurality of key has been actuated for the first time. If so, the method continues to block 410. Otherwise, the method continues to block 412.

At block 410, the delivery interface 200 causes the camera 150 to capture one or more images of the user and/or an area surrounding the delivery interface 200.

At block 412, the delivery interface 200 temporarily displays the second illumination for each actuations of one or more keys among the first plurality of keys 230.

At block 414, the delivery interface 200 determines if a correct access code has been received. If so, the method terminates. Otherwise, the method continues to block 416.

At block 416, the delivery interface 200 causes the first plurality of lighting devices 260 to display the third illumination.

Figure 5:
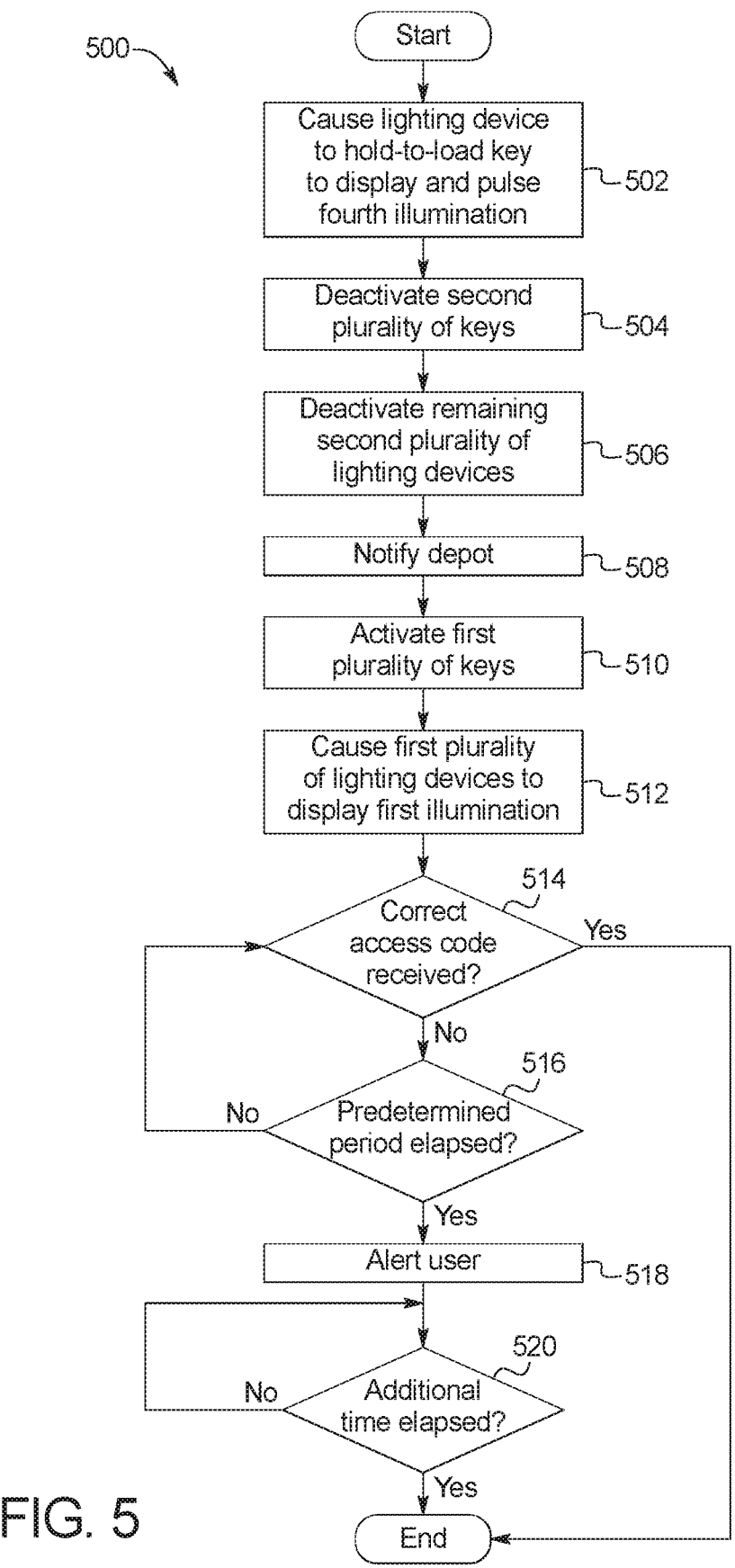
FIG. 5 illustrates a flowchart of a method for performing the hold-to-load operation of FIG. 3.

FIG. 5 illustrates a flowchart of a method for performing the hold-to-load operation of FIG. 3.

At block 502, the delivery interface 200 causes the lighting device of the hold-to-load key 242 to display and pulse the fourth illumination.

At block 504, the delivery interface 200 deactivates the second plurality of keys 240.

At block 506, the delivery interface 200 deactivates the remaining second plurality of lighting devices 270.

At block 508, the delivery interface 200 notifies the depot an occurrence of the hold-to-load operation.

At block 510, the delivery interface 200 activates the first plurality of keys 230.

At block 512, the delivery interface 200 causes the first plurality of lighting devices 260 to display the first illumination. In some examples, the first plurality of lighting devices 260 may be pulsing the first illumination. In some examples, the first plurality of lighting devices 260 may temporarily display the second illumination in response actuations of the first plurality of keys 230.

At block 514 the delivery interface 200 determines if a correct access code has been received. If so, the method terminates. Otherwise, the method continues to block 516.

At block 516, the delivery interface 200 determines if a predetermined period has elapsed. If so, the method continues to block 518. Otherwise, the method returns to block 514.

At block 518, the delivery interface 200 alerts the user via the mobile device and/or the external speaker 180.

At block 520, the delivery interface 200 determines if an additional amount of time has elapsed. If so, the method terminates. Otherwise, the method returns to block 520.

Figure 6:
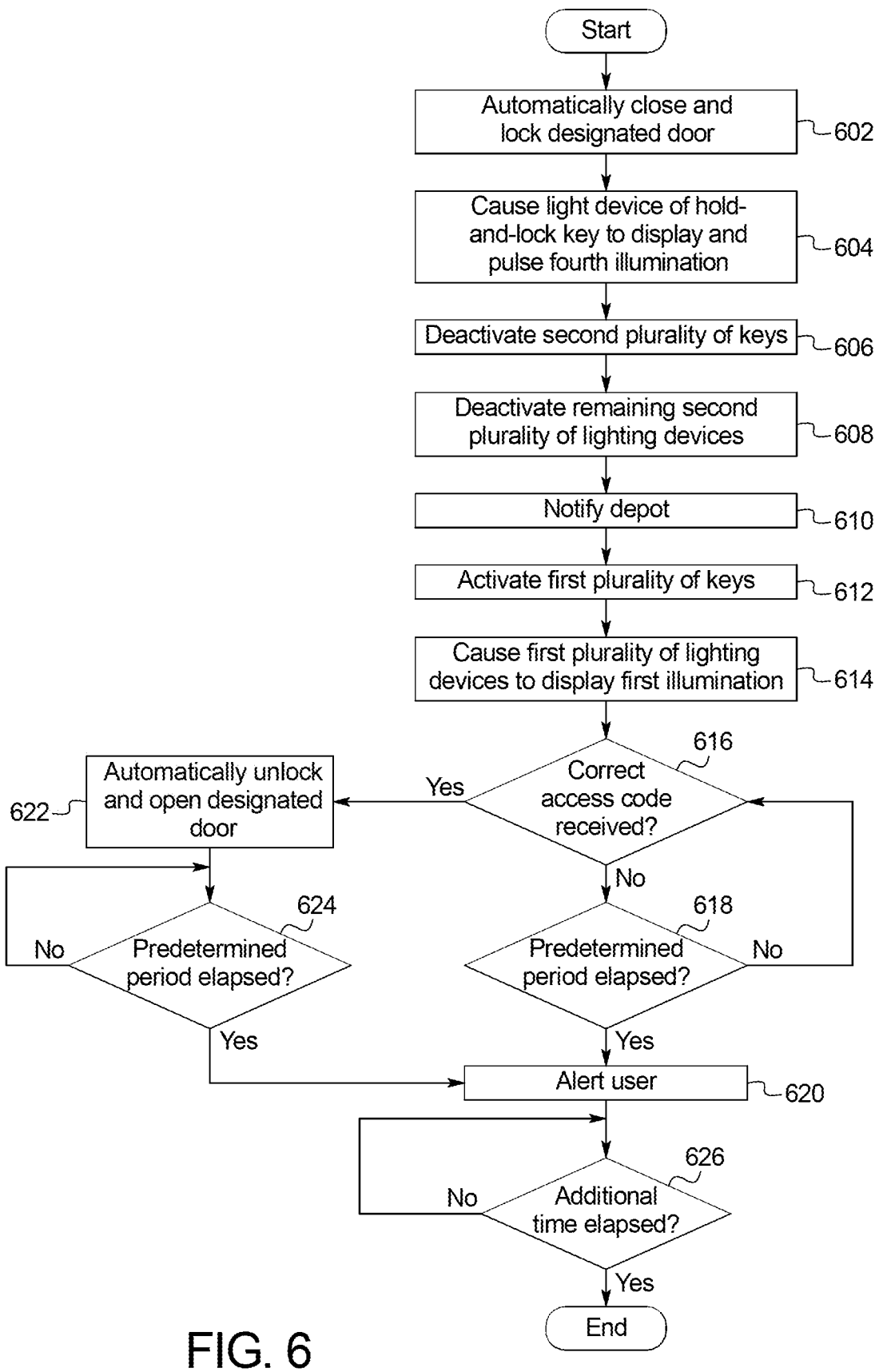
FIG. 6 illustrates a flowchart of a method for performing the hold-and-lock operation of FIG. 3.

FIG. 6 illustrates a flowchart of a method for performing the hold-and-lock operation of FIG. 3.

At block 602, the delivery interface 200 automatically closes and locks the designated door 140.

At block 604, the delivery interface 200 causes the light device of the hold-and-lock key 244 to display and pulse the fourth illumination.

At block 606, the delivery interface 200 deactivates the second plurality of keys 240.

At block 608, the delivery interface 200 deactivates the remaining second plurality of lighting devices 270.

At block 610, the delivery interface 200 notifies the depot an occurrence of the hold-and-lock operation.

At block 612, the delivery interface 200 activates the first plurality of keys 230.

At block 614, the delivery interface 200 causes the first plurality of lighting devices 260 to display the first illumination. In some examples, the first plurality of lighting devices 260 may be pulsing the first illumination. In some examples, the first plurality of lighting devices 260 may temporarily display the second illumination in response actuations of the first plurality of keys 230.

At block 616, the delivery interface 200 determines if a correct access has been received. If so, the method continues to block 622. Otherwise, the method continues to block 618.

At block 618, the delivery interface 200 determines if a predetermined period has elapsed. If so, the method continues to block 620. Otherwise, the method returns to block 616.

At block 620, the delivery interface 200 alerts the user via the mobile device and/or the external speaker 180.

At block 622, the delivery interface 200 automatically unlocks and opens the designated door 140.

At block 624, the delivery interface 200 determines if a predetermined period has elapsed. If so, the method continues to block 620. Otherwise, the method returns to block 624.

At block 626, the delivery interface 200 determines if an additional amount of time has elapsed. If so, the method terminates. Otherwise, the method returns to block 626.

Figure 7:
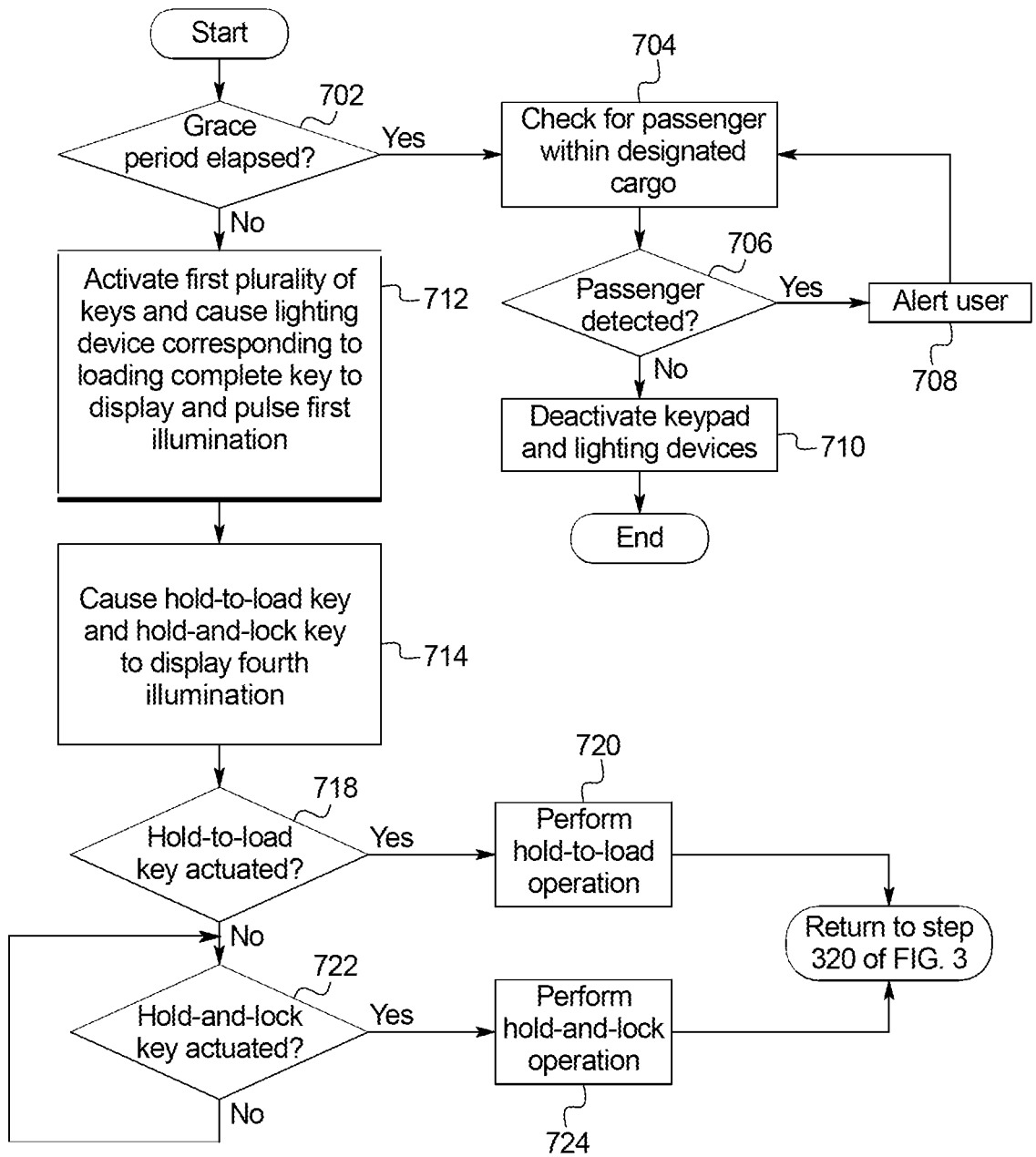
FIG. 7 illustrates a flowchart of a method for performing the loading complete operation of FIG. 3.

FIG. 7 illustrates a flowchart of a method for performing the loading complete operation of FIG. 3.

At block 702, the delivery interface 200 determines if a grace period has elapsed. If so, the method continues to block 704. Otherwise, the method continues to block 712.

At block 704, the delivery interface 200 checks, via one or more sensors within the vehicle 100, for a passenger is within the designated cargo 130.

At block 706, the delivery interface 200 determines if a passenger is within the designated cargo 130. If so, the method continues to block 708. Otherwise, the method continues to block 710.

At block 708, the delivery interface 200 alerts the user via the user via the mobile device and/or the external speaker 180.

At block 710, the delivery interface 200 deactivates the keypad 220 and the lighting devices 250.

At block 712, the delivery interface 200 activates the first plurality of keys 230.

At block 712, the delivery interface 200 causes the lighting device corresponding to the loading complete key 246 to display and pulse the first illumination.

At block 714, the delivery interface 200 causes the hold-to-load key 242 and the hold-and-lock key 244 to display the fourth illumination.

At block 718, the delivery interface 200 determines if the hold-to-load key 242 has been actuated. If so, the method continues to block 720. Otherwise, the method continues to block 722.

At block 720, the delivery interface 200 performs the hold-to-load operation as described in reference with FIG. 5. Subsequently, the method continues at step 320 of FIG. 3.

At block 722, the delivery interface 200 determines if the hold-and-lock key 244 has been actuated. If so, the method continues to block 724. Otherwise, the method continues to block 722.

At block 724, the delivery interface 200 performs the hold-and-lock operation as describe in reference with FIG. 6. Subsequently, the method continues at step 320 of FIG. 3.

Although example methods are described with reference to the flowcharts illustrated in FIGS. 3-7, many other methods of operating the delivery interface 200 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a cargo;
   a door designated for the cargo;
   a user interface comprising a keypad that includes first keys and second keys; and
   a processor configured to:
      activate the first keys upon the vehicle being parked;
      responsive to receiving an access code via the first keys while the vehicle is parked:
         unlock and open the door to provide access to the cargo for a first period; and
         activate the second keys; and
      responsive to a hold-to-load key of the second keys being actuated, continue to
         provide access to the cargo for a second period.

2. The vehicle of claim 1, wherein, responsive to a hold-and-lock key of the second keys being actuated, the processor is further configured to:
   close and lock the door to prevent access to the cargo;
   deactivate the second keys; and
   reactivate the first keys.

3. The vehicle of claim 1, wherein
   responsive to a loading complete key of the second keys being actuated, the processor is further configured to:
      close and lock the door to prevent access to the cargo; and
      deactivate the keypad.

4. The vehicle of claim 1, wherein the first keys include first lighting devices and the second keys include second lighting devices.

5. The vehicle of claim 4, wherein, upon the vehicle being parked, the processor is further configured to:
   activate the first lighting devices to display a first illumination; and
   deactivate the second lighting devices.

6. The vehicle of claim 5, wherein, while the first lighting devices are displaying the first illumination, the processor is further configured to
   cause at least one of the first lighting devices to display a second illumination for a duration of an actuation of at least one of the first keys.

7. The vehicle of claim 6, wherein, responsive to receiving an incorrect code via the first keys, the processor is further configured to
   cause the first lighting devices to display a third illumination.

8. The vehicle of claim 7, wherein, responsive to the one of the activated second keys being actuated, the processor is further configured to
   cause one of the second lighting devices corresponding to the one of the activated second keys to display a fourth illumination during the second period.

9. The vehicle of claim 1, further comprising a camera, wherein, subsequent to the vehicle being parked, the processor is further configured to
   cause the camera to take one or more pictures of an area surrounding the user interface responsive to any one of the first keys being actuated for a first instance.

10. The vehicle of claim 1, further comprising a directional antenna, wherein, when the vehicle is parked, the processor is further configured to:
    wirelessly couple to at least one mobile device via the directional antenna; and
    transmit, to the mobile device, information regarding the user interface via the directional antenna.

11. The vehicle of claim 1, wherein the processor is configured to deactivate the first keys when the first period has elapsed.

12. A method of controlling a vehicle comprising:
    activating, via a processor, first keys of a keypad of a user interface upon the vehicle being parked;
    responsive to receiving an access code via the first keys of the user interface while the vehicle is parked:
       unlocking and opening, via the processor, a door designated for a cargo to provide access to the cargo of the vehicle for a first period; and
       activating, via the processor, second keys of the user interface; and
    responsive to a hold-to-load key of the second keys being actuated, continuing to provide access to the cargo for a second period.

13. The method of claim 12,
    responsive to a hold-and-lock key of the second keys being actuated, further comprising:
    closing and locking, via the processor, the door to prevent access to the cargo;
    deactivating, via the processor, the second keys; and
    reactivating, via the processor, the first keys.

14. The method of claim 12,
    responsive to a loading complete key of the second keys being actuated, further comprising:
    closing and locking, via the processor, the door to prevent access to the cargo; and
    deactivating, via the processor, the keypad.

15. The method of claim 12, upon the vehicle being parked, further comprising:
    activating first lighting devices of the first keys to display a first illumination; and
    deactivating second lighting devices of the second keys.

16. The method of claim 15,
while the first lighting devices are displaying the first illumination, further comprising:
responsive to an actuation of at least one of the first keys, causing, via the processor, at least one of the first lighting devices to display a second illumination for a duration of the actuation; and
responsive to receiving an incorrect code via the first keys, causing, via the processor, the first lighting devices to display a third illumination.

17. The method of claim 16,
responsive to the one of the activated second keys being actuated, causing, via the processor, one of the second lighting devices corresponding to the one of the activated second keys to display a fourth illumination during the second period.

18. The method of claim 12,
subsequent to the vehicle being parked, further comprising
causing, via the processor, a camera to take one or more pictures of an area surrounding the user interface responsive to any one of the first keys being actuated for a first instance.

19. The method of claim 12, when the vehicle is parked, further comprising:
wirelessly coupling at least one mobile device with the user interface via a directional antenna; and
transmitting, to the mobile device, information regarding the user interface via the directional antenna.

20. The method of claim 12, further comprising, deactivating, via the processor, the first keys in response to the first period elapsing.

* * * * *